United States Patent
Ikeno et al.

(10) Patent No.: US 10,629,202 B2
(45) Date of Patent: Apr. 21, 2020

(54) VOICE INTERACTION SYSTEM AND VOICE INTERACTION METHOD FOR OUTPUTTING NON-AUDIBLE SOUND

(71) Applicant: TOYOTA JIDOSHA KABUSHIKI KAISHA, Toyota-shi, Aichi-ken (JP)

(72) Inventors: Atsushi Ikeno, Kyoto (JP); Satoshi Mizuma, Urayasu (JP); Hayato Sakamoto, Kawasaki (JP); Hiroto Konno, Tokyo (JP); Toshifumi Nishijima, Kasugai (JP); Hiromi Tonegawa, Okazaki (JP); Norihide Umeyama, Nisshin (JP); Satoru Sasaki, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 15/954,190

(22) Filed: Apr. 16, 2018

(65) Prior Publication Data
US 2018/0308478 A1 Oct. 25, 2018

(30) Foreign Application Priority Data
Apr. 25, 2017 (JP) .................. 2017-086257

(51) Int. Cl.
*G10L 15/22* (2006.01)
*G10L 13/04* (2013.01)

(52) U.S. Cl.
CPC ............ *G10L 15/22* (2013.01); *G10L 15/222* (2013.01); *G10L 13/043* (2013.01); *G10L 2015/223* (2013.01); *G10L 2015/226* (2013.01)

(58) Field of Classification Search
CPC ........................................ G10L 15/22
USPC .................................. 704/270, 275
See application file for complete search history.

(56) References Cited

U.S. PATENT DOCUMENTS

| 6,104,808 | A * | 8/2000 | Alameh | H04M 1/0214 |
| | | | | 379/433.02 |
| 9,437,186 | B1 * | 9/2016 | Liu | G10L 15/05 |
| 2014/0267933 | A1 * | 9/2014 | Young | H04N 21/42203 |
| | | | | 348/734 |
| 2014/0282003 | A1 * | 9/2014 | Gruber | G06F 3/165 |
| | | | | 715/727 |
| 2015/0006166 | A1 * | 1/2015 | Schmidt | G10L 15/30 |
| | | | | 704/231 |

(Continued)

FOREIGN PATENT DOCUMENTS

| JP | 2005-025100 A | 1/2005 |
| JP | 2013-125085 A | 6/2013 |

(Continued)

*Primary Examiner* — Shaun Roberts
(74) *Attorney, Agent, or Firm* — Oliff PLC

(57) ABSTRACT

A voice interaction system includes: a speaker; a microphone having a microphone gain that is set at a low level while a sound is output from the speaker; a voice recognition unit that implements voice recognition processing on input sound data input from the microphone; a sound output unit that generates output sound data and outputs the generated output sound data through the speaker; and a non-audible sound output unit that, when a plurality of sounds are output with a time interval no greater than a threshold therebetween, outputs a non-audible sound through the speaker at least in the interim between output of the plurality of sounds.

9 Claims, 5 Drawing Sheets

(56) References Cited

U.S. PATENT DOCUMENTS

2015/0085619 A1* 3/2015 Jeong .................... G08C 23/02
367/198
2015/0235637 A1* 8/2015 Casado ................ G10L 15/222
704/235
2015/0294674 A1 10/2015 Takahashi

FOREIGN PATENT DOCUMENTS

| JP | 2013-182044 A | 9/2013 |
| JP | 2014-075674 A | 4/2014 |
| WO | 2014-054314 A1 | 4/2014 |

* cited by examiner

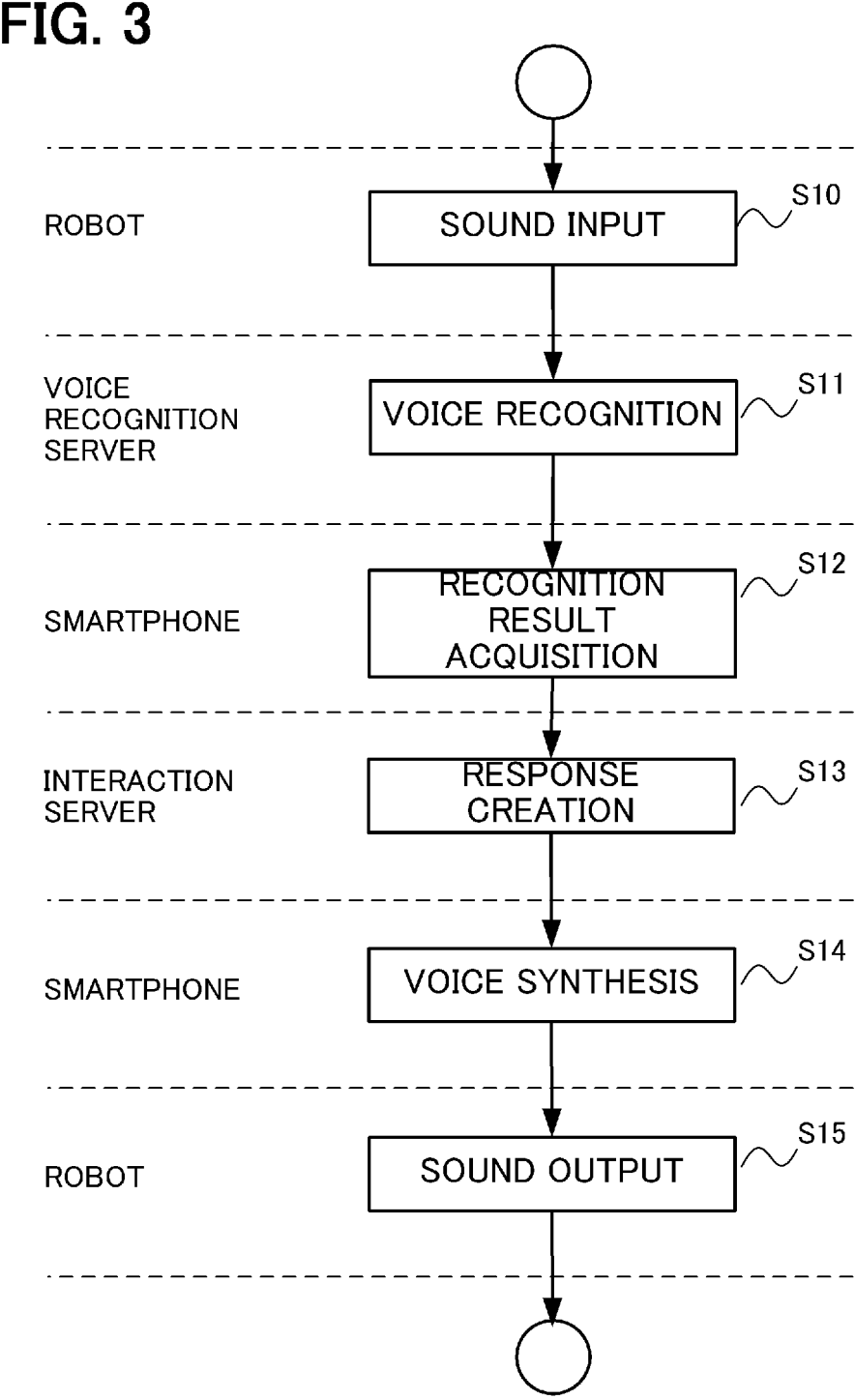

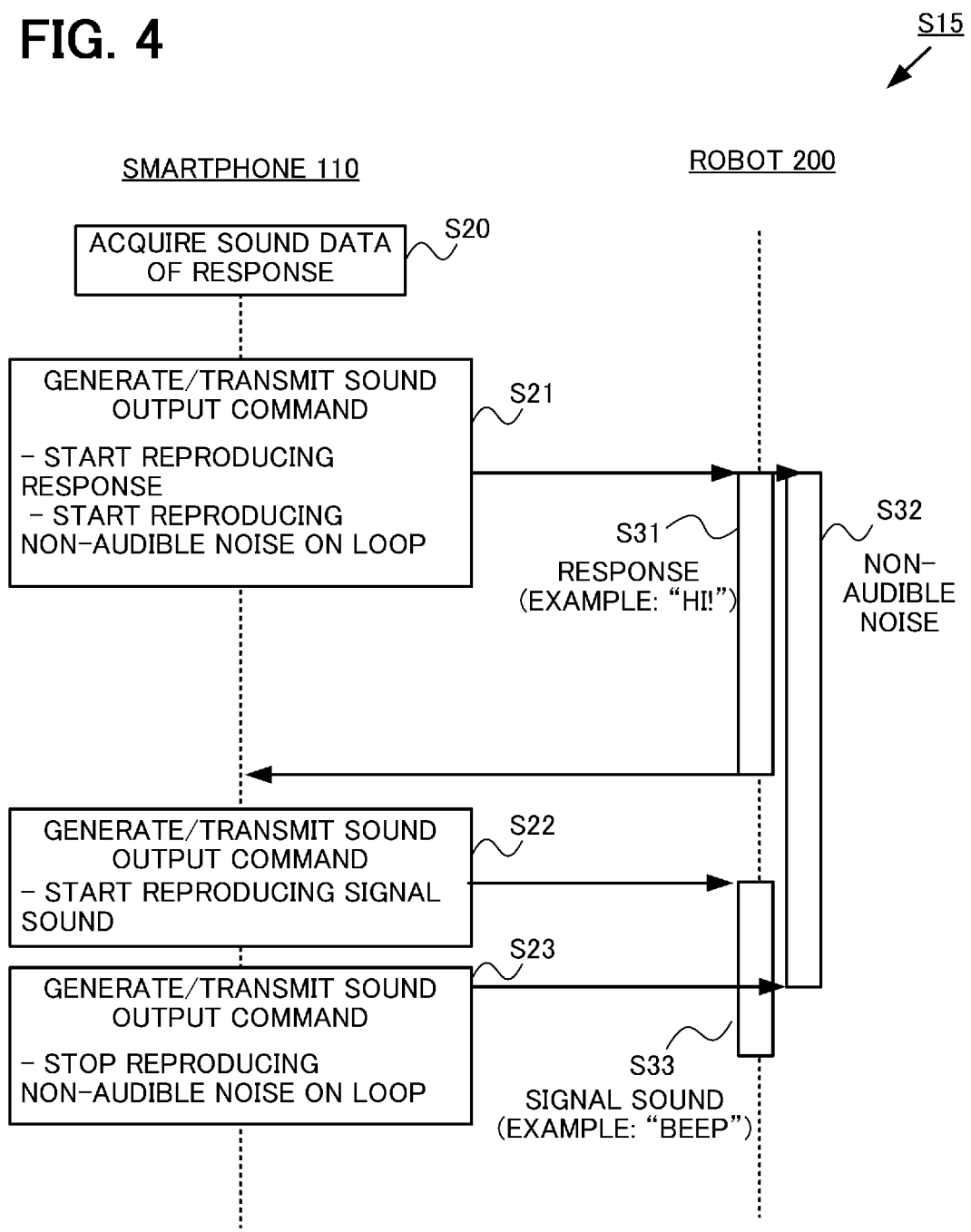

PRESENT METHOD

COMPARATIVE EXAMPLE

VOICE INTERACTION SYSTEM AND VOICE INTERACTION METHOD FOR OUTPUTTING NON-AUDIBLE SOUND

BACKGROUND OF THE INVENTION

Field of the Invention

The present invention relates to a voice interaction system.

Description of the Related Art

A voice interaction system fails at voice recognition when a microphone picks up a voice sound being output from a speaker such that voice recognition processing is started using the picked-up voice sound as a subject. To solve this problem, a voice interaction system has a voice switching function for switching a microphone OFF or reducing a gain thereof during voice sound output.

Here, when a voice interaction system outputs two sounds consecutively with a comparatively short interval therebetween, the microphone continues to function normally in the interim. In the interim, a user may begin an utterance, and in this case, input of the user utterance is cut off at a point where the microphone is switched OFF in response to output of the second sound. Accordingly, voice recognition is performed on the basis of a partial utterance, and as a result, an incorrect operation is performed. Further, a voice interaction system may utter voice data and a short time thereafter output a signal (a beep sound, for example) indicating that sound input from the user can be received. At this time, sounds are not picked up during output of the utterance data and the signal sound, but a problem occurs in that superfluous sounds (a user voice not intended to be input or peripheral noise) are picked up between the two outputs.

In the prior art (Japanese Patent Application Publication No. 2013-125085, Japanese Patent Application Publication No. 2013-182044, Japanese Patent Application Publication No. 2014-75674, WO 2014/054314, and Japanese Patent Application Publication No. 2005-25100), non-target sounds are damped to prevent sounds other than a target sound from being input. In these documents, the following processing is executed. First, a target sound zone in which an input sound signal from a target speaker arrives from a target direction is differentiated from a non-target sound zone in which interference sounds (voices other than the voice of the speaker), which are sounds other than the voice of the speaker, peripheral noise superimposed thereon, and so on occur. Then, in the non-target sound zone, the non-target sounds are damped by reducing the gain of the microphone.

According to this prior art, however, the problem described above cannot be solved.

SUMMARY OF THE INVENTION

An object of the present invention is to prevent an unforeseen operation from occurring upon reception of superfluous sound input when a voice interaction system outputs sounds a plurality of times in quick succession.

A voice interaction system according to an aspect of the present invention includes:
a speaker;
a microphone having a microphone gain that is set at a low level while a sound is output from the speaker;
a voice recognition unit that implements voice recognition processing on input voice data input from the microphone;
a voice output unit that outputs output voice data through the speaker; and
a non-audible voice output unit that, when a plurality of voices are output with a time interval no greater than a threshold therebetween, outputs a non-audible sound through the speaker at least in the interim between output of the plurality of sounds.

In the voice interaction system according to this aspect, the microphone gain is set to be lower when a voice is being output through the speaker than when a voice is not being output. Setting the microphone gain to be low includes switching the microphone function OFF.

The speaker according to this aspect is capable of outputting non-audible sound. The non-audible sound may be higher or lower than audible sound. Audible sound is typically considered to be between 20 Hz and 20 kHz, but as long as the sound equals or exceeds approximately 17 kHz, a sufficient number of users cannot hear the sound, and therefore a sound of 17 kHz or more may be employed as the non-audible sound. Further, in a normal use application, the non-audible sound may be any sound that cannot be heard by the user, and may partially include a sound component having an audible sound frequency. The microphone according to this aspect may either be capable of or incapable of acquiring the non-audible voice output through the speaker.

When the voice interaction system outputs a plurality of voices with a time interval no greater than the threshold therebetween, the non-audible voice output unit according to this aspect outputs the non-audible sound through the speaker at least in the interim between output of the plurality of voices. The time interval threshold may be set at a time interval between two consecutively output voices, in which the user is not expected to make an utterance. Any sound may be employed as the output non-audible sound. For example, white noise or a single-frequency sound within a non-audible range may be employed. The output timing of the non-audible sound is to include a range extending from a point at which output of the preceding voice is completed to a point at which output of the following voice is started. For example, the output timing of the non-audible sound may be set to extend from a point at which output of the preceding voice is started to a point at which output of the following voice is completed.

In this aspect, a control unit that executes the following processing when a first voice and a second voice are output with a time interval no greater than the threshold therebetween is preferably provided. More specifically, the control unit issues a command to start reproducing the first voice and a command to start reproducing the non-audible sound continuously, and once reproduction of the first voice is complete, issues a command to start reproducing the second voice and to stop continuously reproducing the non-audible sound. The command to stop continuously reproducing the non-audible sound is preferably issued either simultaneously with or following the command to start reproducing the second voice. Alternatively, the control unit may issue a command to start reproducing the first voice and a command to start reproducing the non-audible sound continuously, issue a command to start reproducing the second voice once reproduction of the first voice is complete, and issue a command to stop continuously reproducing the non-audible sound once reproduction of the second voice is complete.

The voice recognition unit according to this aspect implements the voice recognition processing on the input voice data input from the microphone. At this time, the voice recognition unit preferably implements the voice recognition processing when a volume of the input voice data in an audible frequency band equals or exceeds a predetermined value. Further, the voice recognition unit may implement recognition on voice data from which non-audible sound has been removed by filter processing.

Note that the present invention may also be interpreted as a voice interaction system including at least apart of the means described above. The present invention may also be interpreted as a voice interaction method or an utterance output method for executing at least a part of the processing described above. The present invention may also be interpreted as a computer program for causing a computer to execute the method, or a computer-readable storage medium that stores the computer program non-temporarily. The present invention may be configured by combining the respective means and processing described above in any possible combinations.

According to the present invention, an unforeseen operation generated upon reception of superfluous voice input can be prevented from occurring when a voice interaction system outputs voices a plurality of times in quick succession.

BRIEF DESCRIPTION OF THE DRAWINGS

FIG. 3 is a flowchart showing a flow of overall processing of a voice interaction method employed by the voice interaction system according to this embodiment;

FIG. 4 is a view showing an example of a flow of interaction processing (utterance processing) employed by the voice interaction system according to this embodiment.

DESCRIPTION OF THE EMBODIMENTS

A preferred exemplary embodiment of the present invention will be described in detail below with reference to the figures. The embodiment described below is a system in which a voice interactive robot is used as a local voice interaction terminal, but the local voice interaction terminal does not have to be a robot, and any desired information processing device, voice interactive interface, or the like may be used.

<System Configuration>

Figure 1:
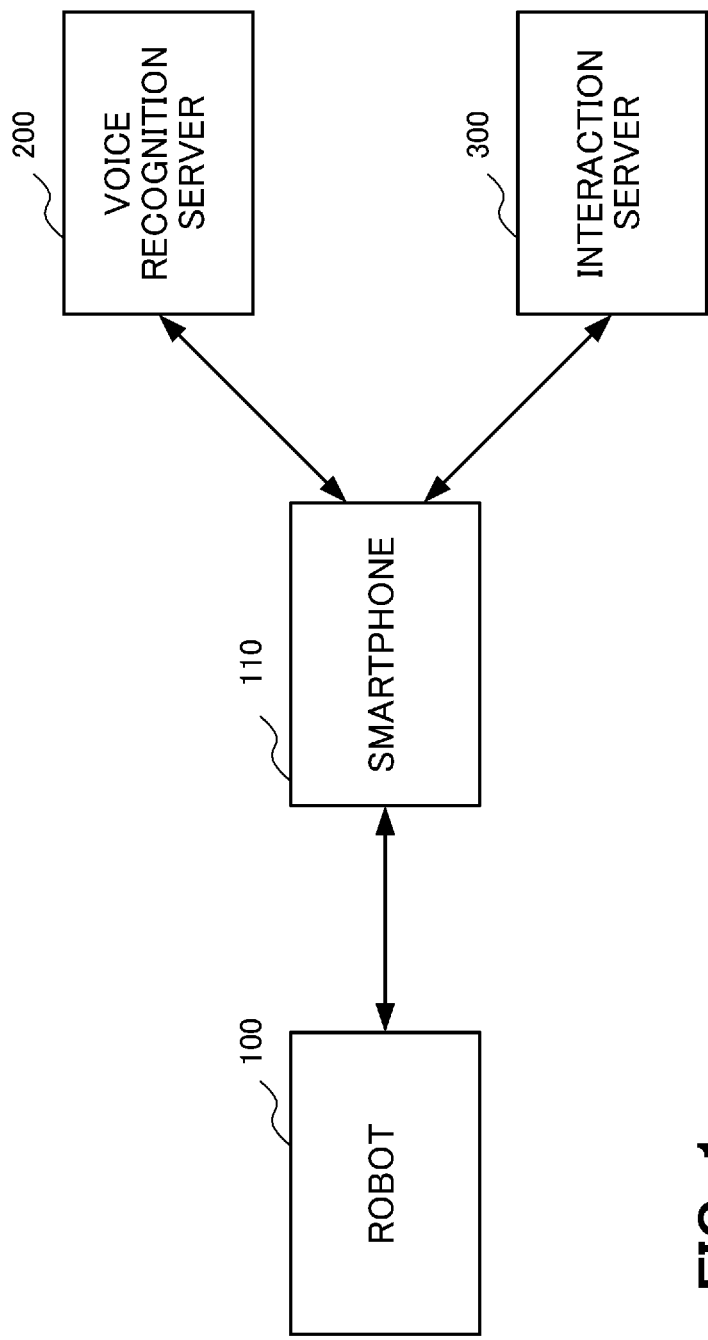
FIG. 1 is a view showing a system configuration of a voice interaction system according to an embodiment.
Figure 2:
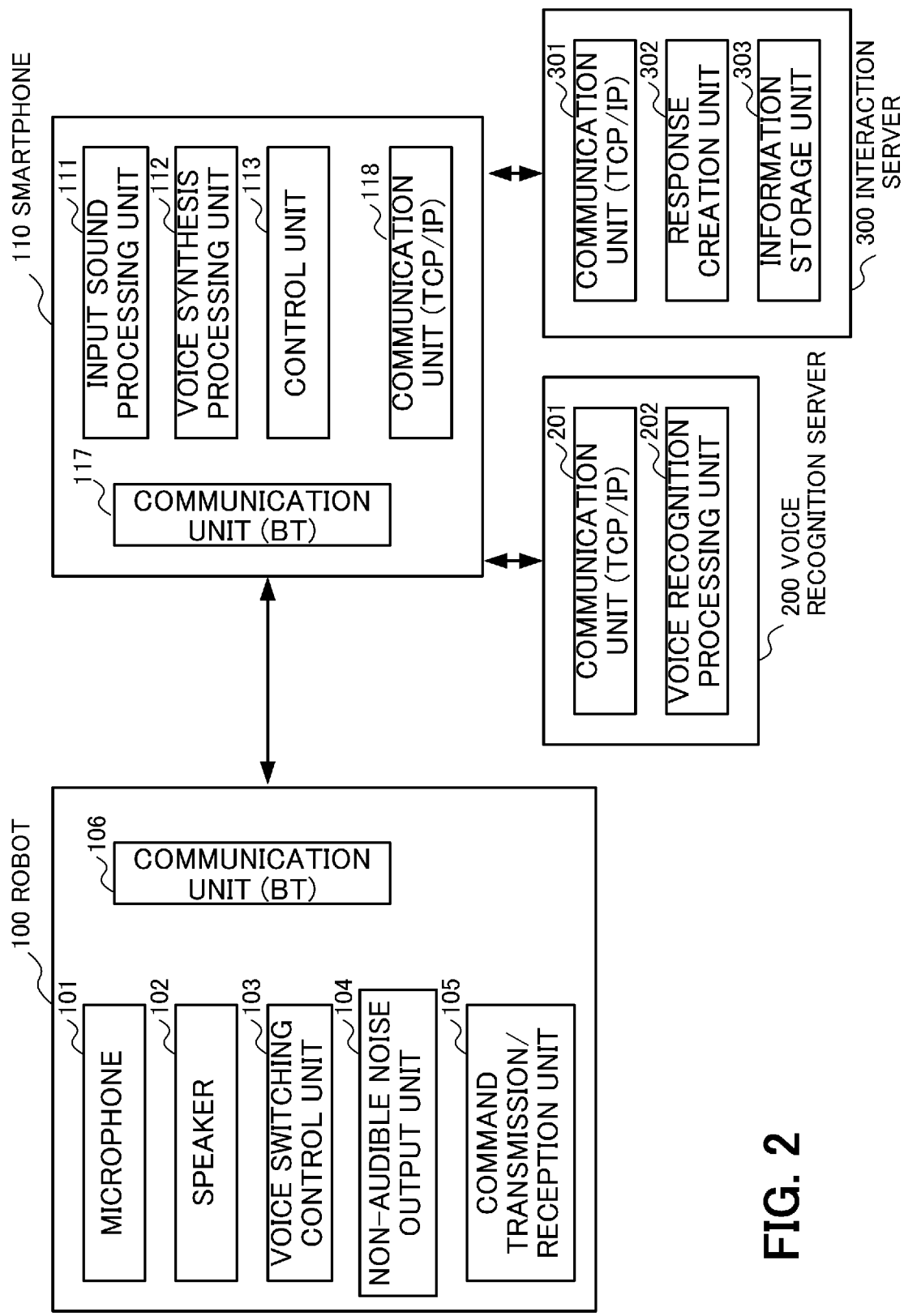
FIG. 2 is a view showing a functional configuration of the voice interaction system according to this embodiment.

FIG. 1 is a view showing a system configuration of a voice interaction system according to this embodiment, and FIG. 2 is a view showing a functional configuration thereof. As shown in FIGS. 1 and 2, the voice interaction system according to this embodiment is constituted by a robot 100, a smartphone 110, a voice recognition server 200, and an interaction server 300.

The robot (a voice interactive robot) 100 includes a microphone (a sound input unit) 101, a speaker (a sound output unit) 102, a voice switching control unit 103, a non-audible noise output unit 104, a command transmission/reception unit 105, and a communication unit (Bluetooth: BT (registered trademark)) 106. Although not shown in the drawings, the robot 100 includes an image input unit (a camera), movable joints (a face, an arm, a leg, and so on), driving control units for driving the movable joints, various types of lights, control units for switching the lights ON and OFF, and so on.

The robot 100 acquires a voice/sound of a user using the microphone 101, and acquires an image of the user using the image input unit. The robot 100 transmits the input sound and the input image to the smartphone 110 via the communication unit 105. Upon reception of a command from the smartphone 110, the robot 100 outputs a sound through the speaker 102, drives the movable joints, and so on in accordance with the command.

The voice switching control unit 103 executes processing to reduce a gain of the microphone 101 while a sound is being output through the speaker 102. In this embodiment, as will be described below, voice recognition processing is executed when the volume of an input sound equals or exceeds a threshold. Therefore, the voice switching control unit 103 preferably reduces the gain of the microphone to a volume at which the voice recognition processing is not started. The voice switching control unit 103 may set the gain at zero. In this embodiment, the robot 100 does not execute ON/OFF control on the microphone 101 and the speaker 102, and instead, this ON/OFF control is executed in response to a command from the smartphone 110. The robot 100 uses the voice switching control unit 103 to prevent a sound output through the speaker 102 from being input into the microphone 101.

The non-audible noise output unit 104 executes control to output white noise in a non-audible range through the speaker 102. As will be described below, the non-audible noise output unit 104 outputs the white noise in response to a command from the command transmission/reception unit 105 after the command transmission/reception unit 105 receives a sound output command.

The command transmission/reception unit 105 receives commands from the smartphone 110 via the communication unit (BT) 106 and controls the robot 100 in accordance with the received commands. Further, the command transmission/reception unit 105 transmits commands to the smartphone 110 via the communication unit (BT) 106.

The communication unit (BT) 106 communicates with the smartphone 110 in accordance with Bluetooth (registered trademark) standards.

The smartphone 110 is a computer having a calculation device such as a microprocessor, a storage unit such as a memory, an input/output device such as a touch screen, a communication device, and so on. By having the microprocessor execute a program, the smartphone 110 is provided with an input sound processing unit 111, a voice synthesis processing unit 112, a control unit 113, a communication unit (BT) 117, and a communication unit (TCP/IP) 118.

The input sound processing unit 111 receives sound data from the robot 100, transmits the sound data to the voice recognition server 200 via the communication unit 118, and asks the voice recognition server 200 to execute voice recognition processing. Note that the input sound processing unit 111 may ask the voice recognition server 200 to execute the voice recognition processing after partially executing preprocessing (noise removal, speaker separation, and so on). The input sound processing unit 111 transmits a voice recognition result generated by the voice recognition server 200 to the interaction server 300 via the communication unit 118, and then asks the interaction server 300 to generate text (a sentence to be uttered by the robot 100) of a response to a user utterance.

The voice synthesis processing unit 112 acquires the text of the response, and generates voice data to be uttered by the robot 100 by executing voice synthesis processing thereon.

The control unit 113 controls all of the processing executed by the smartphone 110. The communication unit (BT) 117 communicates with the robot 100 in accordance with Bluetooth (registered trademark) standards. The communication unit (TCP/IP) 118 communicates with the voice recognition server 200 and the interaction server 300 in accordance with TCP/IP standards.

The voice recognition server 200 is a computer having a calculation device such as a microprocessor, a memory, a communication device, and so on, and includes a communication unit 201 and a voice recognition processing unit 202. The voice recognition server 200 preferably employs the non-target voice removal technique of the prior art. The voice recognition server 200 is sufficiently rich in resources to be capable of high-precision voice recognition.

The interaction server 300 is a computer having a calculation device such as a microprocessor, a memory, a communication device, and so on, and includes a communication unit 301, a response creation unit 302, and an information storage unit 303. The information storage unit 303 stores interaction scenarios used to create responses. The response creation unit 302 creates a response to a user utterance by referring to the interaction scenarios in the information storage unit 303. The interaction server 300 is sufficiently rich in resources (a high-speed calculation unit, a large-capacity interaction scenario DB, and so on) to be capable of generating sophisticated responses.

<Overall Processing>

Referring to FIG. 3, a flow of overall processing executed by the voice interaction system according to this embodiment will be described. Processing shown on a flowchart in FIG. 3 is executed repeatedly.

In step S10, when the robot 100 receives sound input corresponding to a user utterance from the microphone 101, the robot 100 transmits input sound data to the input sound processing unit 111 of the smartphone 110 via the communication unit 106. The input sound processing unit 111 transmits the input sound data to the voice recognition server 200.

In step S11, the voice recognition processing unit 202 of the voice recognition server 200 implements voice recognition processing.

Note that the voice recognition processing of step S11 is implemented only when the volume of the user utterance (the volume in an audible frequency band) equals or exceeds a predetermined value. Accordingly, the input sound processing unit 111 of the smartphone 110 may extract an audible frequency band component from the input sound data by filter processing, and check the volume of the extracted sound data. The input sound processing unit 111 then transmits the sound data to the voice recognition server 200 only when the volume thereof equals or exceeds a predetermined value. The sound data transmitted to the voice recognition server 200 is preferably filter-processed sound data, but the input sound data may be transmitted as is.

In step S12, the input sound processing unit 111 of the smartphone 110 acquires the recognition result generated by the voice recognition server 200. The input sound processing unit 111 transmits the voice recognition result to the interaction server 300 and asks the interaction server 300 to create a response. Note that at this time, information other than the voice recognition result, for example information such as a face image of the user and the current position of the user, may also be transmitted to the interaction server 300. Further, here, the voice recognition result is transmitted from the voice recognition server 200 to the interaction server 300 via the smartphone 110, but the voice recognition result may be transmitted to the interaction server 300 directly from the voice recognition server 200.

In step S13, the response creation unit 302 of the interaction server 300 generates the text of a response to the voice recognition result. At this time, the interaction server 300 refers to the interaction scenarios stored in the information storage unit 303. The response text generated by the interaction server 300 is transmitted to the smartphone 110.

In step S14, when the smartphone 110 receives the response text from the interaction server 300, the voice synthesis processing unit 112 generates voice data corresponding to the response text by means of voice synthesis processing.

In step S15, the robot 100 outputs the response by voice in accordance with a command from the smartphone 110. More specifically, the control unit 113 of the smartphone 110 generates a sound output command including the sound data, and transmits the generated command to the robot 100, whereupon the robot 100 outputs sound data corresponding to the response through the speaker 102 on the basis of the command. In this embodiment, sound output from the robot 100 is basically performed by outputting the response generated by the interaction server 300 and a signal sound prompting the user to make an utterance consecutively with a short time interval therebetween. In other words, when the robot 100 makes an utterance, a signal sound (a beeping sound, for example) for informing the user that the system utterance is complete and voice recognition has started is output after outputting the response. In this embodiment, processing is implemented at this time to prevent a user utterance from being acquired and subjected to voice recognition processing between system utterances. This processing will be described in detail below.

<Voice Output Processing>

FIG. 4 is a view illustrating processing (step S15 in FIG. 3) executed when a sound is output from the robot 100 in the voice interaction system according to this embodiment. In this embodiment, as described above, the robot 100 outputs the response generated by the interaction server 300 and a signal sound prompting the user to make an utterance consecutively with a short time interval therebetween. FIG. 4 shows processing executed in a case where two voice/sound outputs are output consecutively with a time interval no greater than a threshold therebetween. When a single voice/sound is output or a plurality of voices/sounds are output with a time interval exceeding the threshold therebetween, there is no need to follow the processing shown in FIG. 4.

In step S20, the control unit 113 of the smartphone 110 acquires the sound data of the response generated by the voice synthesis processing unit 112.

In step S21, the control unit 113 generates a sound output command specifying that (1) reproduction of the response voice is to be started, and (2) reproduction of non-audible noise is to be started on a loop (i.e. continuous reproduction is to be started), and transmits the generated command to the robot 100.

Upon reception of the command, the robot 100 starts to reproduce the sound data of the response through the speaker 102 (S31), and starts to reproduce the non-audible noise on a loop (S32). Loop reproduction of the non-audible noise is implemented by having the non-audible noise output unit 104 repeatedly output sound data corresponding to non-audible noise through the speaker 102. In so doing, a sound in which the response voice and the non-audible noise overlap is output through the speaker 102, and when reproduction of the response voice is complete, only the non-audible noise is output. The voice data corresponding to the non-audible noise may be stored in the robot 100 in advance, or may be generated dynamically by the robot 100 or transmitted to the robot 100 from the smartphone 110.

Here, the non-audible noise may be any sound in a non-audible range (a range other than 20 Hz to 20 kHz) that cannot be heard by the user. Further, the non-audible noise is output so that the microphone gain reduction processing executed by the voice switching control unit 103 is activated. For example, when output at a volume (an intensity) no lower than a threshold is required to activate the microphone gain reduction processing, the non-audible noise is output at a volume no lower than this threshold.

While the robot 100 executes sound output, the voice switching control unit 103 executes control to reduce the gain of the microphone 101. Hence, during sound output, a situation in which the sound being output, a user utterance, or the like is acquired from the microphone 101 and subjected to voice recognition processing can be prevented from occurring.

Response reproduction (S31) by the robot 100 is completed following the elapse of a predetermined time. Here, the command transmission/reception unit 105 of the robot 100 may notify the smartphone 110 by communication that response reproduction is complete. The non-audible noise, on the other hand, is reproduced on a loop, and therefore reproduction thereof continues until an explicit stop command is received.

Having received the notification that reproduction of the response is complete, the smartphone 110 transmits a sound output command specifying that reproduction of the signal sound for prompting the user to make an utterance is to be started (S22). The sound output command specifying that reproduction of the signal sound is to be started need not be based on the reproduction completion notification, and may be transmitted following the elapse of a predetermined time (determined according to the length of the response) following transmission of the response output command.

Further, immediately after transmitting the signal sound reproduction start command, the smartphone 110 transmits a sound output command specifying that loop reproduction of the non-audible noise is to be stopped (S23). Note that the signal sound reproduction start command and the non-audible noise loop reproduction stop command may be transmitted simultaneously to the robot 100.

Upon reception of the signal sound reproduction start command, the robot 100 outputs the signal sound through the speaker 102 (S33). Voice data corresponding to the signal sound may be stored in the sound output command and transmitted to the robot 100 from the smartphone 110, or voice data stored in the robot 100 in advance may be used. Further, upon reception of the non-audible noise loop reproduction stop command, the robot 100 stops outputting the non-audible noise.

In the processing described above, the non-audible noise loop reproduction stop command may be output simultaneously with or following the signal sound reproduction start command. Accordingly, the smartphone 110 may transmit the non-audible noise loop reproduction command to the robot 100 after receiving from the robot 100 notification that reproduction of the signal sound is complete, for example. Further, the robot 100 may stop continuously reproducing the non-audible noise at the stage where the robot 100 detects that reproduction of the signal sound is complete. With these methods, strictly speaking, reproduction of the non-audible noise is stopped after reproduction of the signal sound is complete, but the user perceives that reproduction of the signal sound and reproduction of the non-audible noise are completed substantially simultaneously.

<Actions/Effects>

Figure 5A:
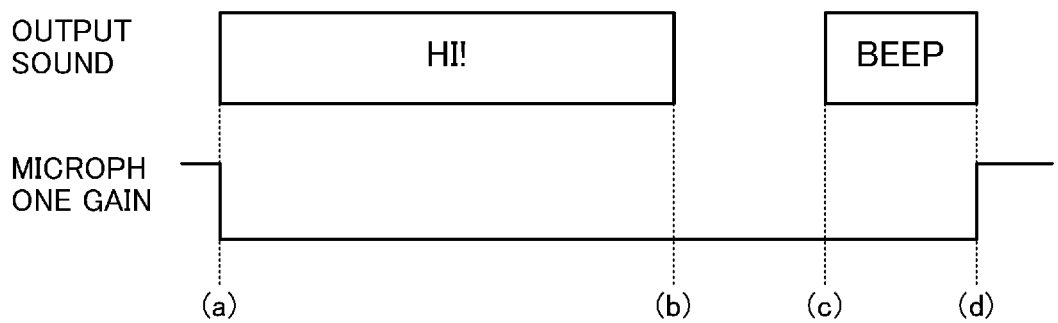
FIGS. 5A and 5B are views illustrating the interaction processing (utterance processing) employed by the voice interaction system according to this embodiment.
Figure 5B:
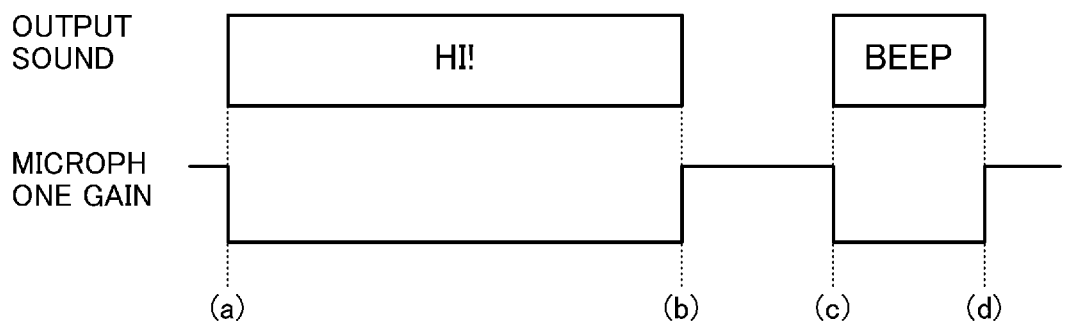

Referring to FIGS. 5A and 5B, actions and effects of the sound output processing according to this embodiment will be described. FIG. 5A is a view showing a relationship between the output sound and the microphone gain when sound output according to this embodiment is implemented. FIG. 5B is a view showing the relationship between the output sound and the microphone gain according to a comparative example in which two sounds (the response and the signal sound) are output consecutively without outputting the non-audible noise. Timings a and b in the drawings denote timings at which output of the response is started and completed, while timings c and d denote timings at which output of the signal sound is started and completed.

In both methods, the microphone gain is reduced by the voice switching control unit 103 during output of the response (the timings a-b) and during output of the signal sound (the timings c-d). As a result, a situation in which a user utterance or a sound output through the speaker 102 is subjected to voice recognition processing during that period is avoided.

Here, with the method (FIG. 5B) in which the non-audible noise is not used, no sound is output through the speaker 102 between the timing b at which output of the response is completed and the timing c at which output of the signal sound is started. In other words, between the timings b and c, the voice switching control unit 103 does not function, and therefore the microphone gain is set at a normal value. During this period, therefore, superfluous sounds such as a user voice not intended to be input or peripheral noise may be input. Moreover, in certain cases, voice recognition processing may be executed on a voice acquired during this period such that an unintended operation occurs.

With the method (FIG. 5A) according to this embodiment, on the other hand, loop reproduction of the non-audible noise is continued even after the response has been output. More specifically, the microphone gain is set at a low level by the voice switching control unit 103 also between the timings b and c. During this period, therefore, a situation in which superfluous sounds such as a user voice not intended to be input or peripheral noise are input and voice recognition processing is executed thereon does not occur, and as a result, the occurrence of an unintended operation can be suppressed.

Furthermore, in this embodiment, the smartphone 110 and the robot 100 are connected by wireless communication, and therefore the timing of sound output from the robot 100 may cause a control delay, a communication delay, or the like such that the sound output cannot be ascertained precisely in the smartphone 110. In this embodiment, it is possible to ensure that the non-audible noise is output in the interval between the response and reproduction of the signal sound even when the reproduction start and completion timings of the response voice and the signal sound cannot be ascertained precisely in the smartphone 110, and therefore input of superfluous sounds during this period can be suppressed.

Modified Examples

The configurations of the embodiments and modified examples described above may be employed in appropriate combinations within a scope that does not depart from the technical spirit of the present invention. Further, the present invention may be realized after applying appropriate modifications thereto within a scope that does not depart from the spirit thereof.

The above description focuses on processing executed in a case where two sounds are output consecutively with a short time interval therebetween. As noted above, when only one sound is output or a plurality of sounds are output with a time interval equaling or exceeding the threshold therebetween, the processing shown in FIG. 4 does not have to be executed. Accordingly, the smartphone 110 may determine whether or not the plurality of sounds are output with a time interval no greater than the threshold therebetween such that the processing shown in FIG. 4 is executed only when the time interval is no greater than the threshold. Alternatively, in a case where a further sound is always output at a time interval no greater than the threshold whenever a sound is output, the processing shown in FIG. 4 may be executed at all times, without inserting determination processing.

In the above description, a combination of a response and a signal sound was described as an example of consecutively output sounds, but there are no particular limitations on the content of the output sounds. Further, the number of consecutive sounds does not have to be two, and three or more sounds may be output consecutively.

The voice interaction system does not have to be constituted by a robot, a smartphone, a voice recognition server, an interaction server, and so on, as in the above embodiment, and the overall system configuration may be set as desired as long as the functions described above can be realized. For example, all of the functions may be executed by a single device. Alternatively, a function implemented by a single device in the above embodiment may be apportioned to and executed by a plurality of devices. Moreover, the respective functions do not have to be executed by the above devices. For example, a part of the processing executed by the smartphone may be executed in the robot.

What is claimed is:

1. A voice interaction system comprising:
a speaker;
a microphone having a microphone gain that is set at a low level while a sound is output from the speaker; and
at least one microprocessor programmed to:
execute voice recognition processing on an input sound that is input from the microphone;
output sound through the speaker; and
when a plurality of sounds are output at a time interval no greater than a predetermined threshold therebetween, output a non-audible sound through the speaker at least in the interim between the output of the plurality of sounds, wherein
the microphone gain is set at the low level while the non-audible sound is being output through the speaker.

2. The voice interaction system according to claim 1, wherein
the microprocessor is further programmed to:
when a first sound and a second sound are output at a time interval no greater than the predetermined threshold therebetween, start reproducing the first sound and start reproducing the non-audible sound continuously, and
once reproduction of the first sound is complete, start reproducing the second sound and stop continuously reproducing the non-audible sound.

3. The voice interaction system according to claim 1, wherein
when a first sound and a second sound are output at a time interval no greater than the predetermined threshold therebetween, the microprocessor is programmed to:
start reproducing the first sound and a command to start reproducing the non-audible sound continuously,
start reproducing the second sound once reproduction of the first sound is complete, and
stop continuously reproducing the non-audible sound once reproduction of the second sound is complete.

4. The voice interaction system according to claim 1, wherein the microprocessor executes the voice recognition processing when a volume of the input sound in an audible frequency band equals or exceeds a predetermined value.

5. The voice interaction system according to claim 1, wherein setting the microphone gain at the low level includes: (a) reducing the microphone gain to a volume at which the voice recognition processing is started, or (b) reducing the microphone gain to zero.

6. A voice interaction method executed by a voice interaction system including a speaker and a microphone having a microphone gain that is set at a low level while a sound is output from the speaker, the voice interaction method comprising:
outputting a first output sound through the speaker;
outputting a second output sound through the speaker at a time interval no greater than a threshold following the output of the first output sound; and
outputting a non-audible sound through the speaker at least between the output of the first output sound and the output of the second output sound, wherein
the microphone gain is set at the low level while the non-audible sound is being output through the speaker.

7. The voice interaction method according to claim 6, wherein setting the microphone gain at the low level includes: (a) reducing the microphone gain to a volume at which the voice recognition processing is started, or (b) reducing the microphone gain to zero.

8. A non-transitory computer-readable medium storing a program causing a computer that is connected to: (i) a speaker, and (ii) a microphone having a microphone gain that is set at a low level while sound is output from the speaker, to execute steps comprising:
outputting a first output sound through the speaker;
outputting a second output sound through the speaker at a time interval no greater than a threshold following the output of the first output sound; and
outputting a non-audible sound through the speaker at least between the output of the first output sound and the output of the second output sound, wherein
the microphone gain is set at the low level while the non-audible sound is being output through the speaker.

9. The non-transitory computer-readable medium according to claim 8, wherein setting the microphone gain at the low level includes: (a) reducing the microphone gain to a volume at which the voice recognition processing is started, or (b) reducing the microphone gain to zero.

* * * * *